June 15, 1954
G. C. THRIFT ET AL
2,681,219
GAS-LIQUID CONTACT APPARATUS
Filed Sept. 5, 1952
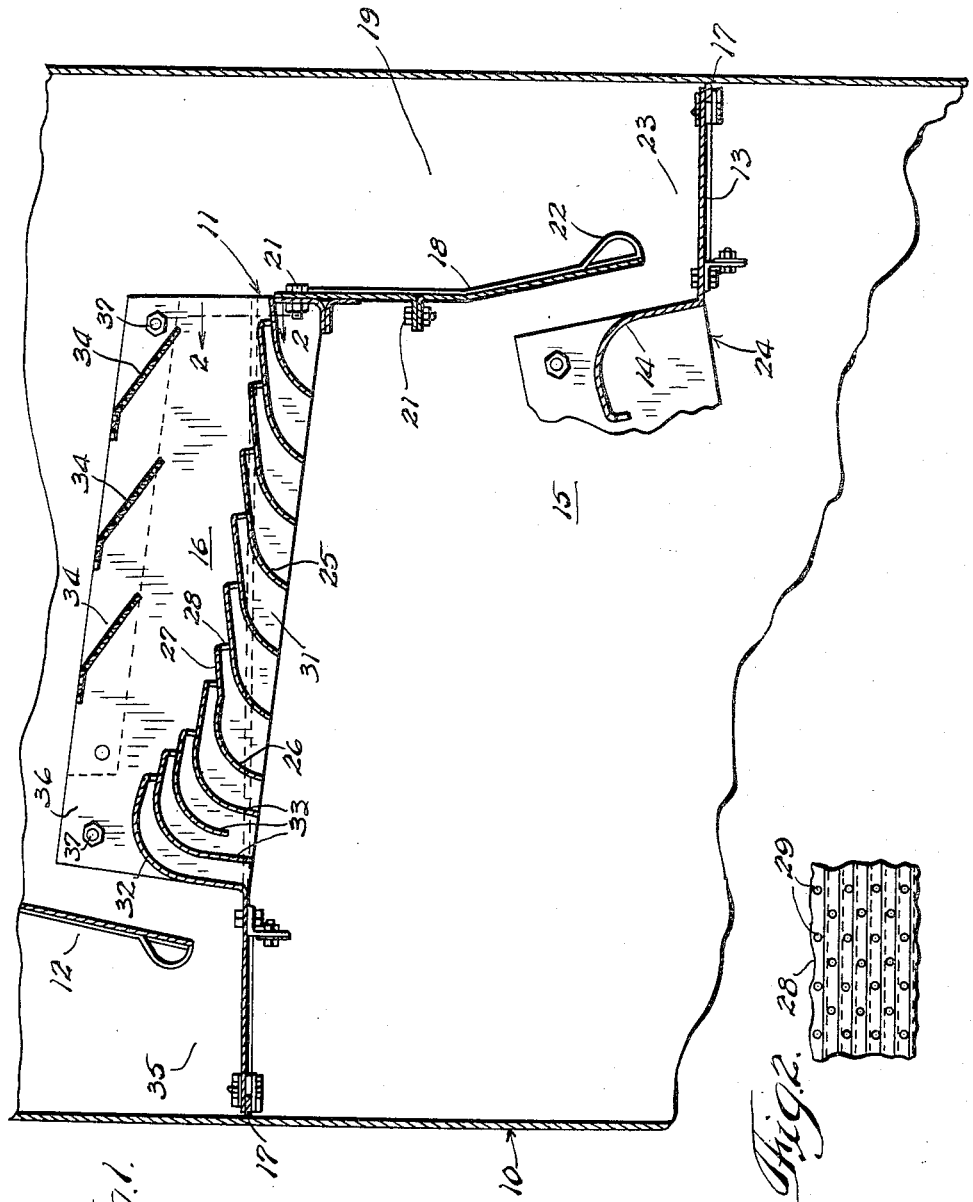
INVENTORS
Griffin C. Thrift
David R. Lohr
BY
Thiess, Olson & Mecklenburger
Attys.

Patented June 15, 1954

2,681,219

UNITED STATES PATENT OFFICE 2,681,219

GAS-LIQUID CONTACT APPARATUS

Griffin C. Thrift and David R. Lohr, Wichita, Kans., assignors to Koch Engineering Company, Inc., Wichita, Kans., a corporation of Kansas Application September 5, 1952, Serial No. 307,976

3 Claims. (Cl. 261—114)

This invention relates to the gas-liquid contact art and has for a principal object the provision of improved apparatus for contacting gases and liquids.

In the gas-liquid contact art, and particularly the art of dephlegmation or fractionation, an important consideration is to provide equipment which will permit liquids and gases or vapors to be thoroughly contacted and then disengaged whereby gases or vapors and liquids are withdrawn from the equipment as separate products. In the past it has been the usual practice to provide a gas-liquid contact chamber or tower including a plurality of transverse trays through which the gases or vapors pass and over which the liquid flows. Such trays known to the art are the usual bubble trays, perforated trays, and the like. Many of the prior art trays, however, have not been entirely satisfactory since only limited quantities of liquid and gas can be passed through a tray of a given size and also because of the large pressure drops occurring across each individual tray.

Accordingly, it is one object of this invention to provide apparatus in which relatively large quantities of liquid and gases may be rapidly and efficiently contacted with each other.

A still further object of this invention is the provision of apparatus for intimately contacting liquids and gases in such a manner that only a small pressure drop occurs across the contacting section.

A still further object of this invention is the provision of a gas-liquid contact tray which may be readily installed in conventional gas-liquid contact towers or chambers.

A still further object of this invention is the provision of a gas-liquid contact tray which is simple to construct and which may readily be modified to conform to desired conditions within the tower whereby efficient gas-liquid contact is achieved.

It is still another object of this invention to provide an improved gas-liquid contact tray in which the distribution of vapor over the entire contact area may be more accurately controlled to provide greater uniformity over the contact area.

It is an additional object of this invention to provide an improved gas-liquid contact tray forming an integral rigid structure having low vapor load requirements and adapted for use with high vapor velocities and liquid loads.

Further and additional objects will become manifest from a consideration of the following description, the accompanying drawings and the appended claims.

The present invention relates particularly to further inventive improvements in the apparatus disclosed and claimed in the copending patent application of Clifford Andrew Huggins, Serial No. 243,240, filed August 23, 1951.

In accordance with one embodiment of this invention, a gas-liquid contact tray is provided which may be installed transversely in the usual type of fractionating or dephlegmating tower. The tray comprises a plurality of transverse, elongated baffle elements that are aligned to form a generally horizontal contact area over which the liquid flows. Each of the baffle elements is in the form of an inverted trough, preferably curvilinear in cross section, each having a lower surface lying within a generally vertical plane and an upper surface lying within a generally horizontal plane. Each of the baffle elements has a generally vertical perforate flange extending downwardly from said upper surface and the several baffle elements are arranged in a spaced, overlapping relationship whereby the flange of each baffle element engages an adjacent baffle element. In operation, vapors or gases pass upwardly through the tray between the elongated baffle elements and are diverted transversely through the perforations in said generally vertical flange and across the upper surface of the tray into contact with the liquid flowing thereover. The gases or vapors pick up the liquid by entrainment, thus causing a thorough contact between the liquid and the vapors or gases. In accordance with the invention, the gases or vapors are projected onto the upper surface of the tray at a relatively high velocity thereby tending to hurl or jet the liquids across the tray surface.

The vapor thus passes over the top of the tray in a plurality of individual jets produced as a result of the perforations or openings in the walls or flanges provided in the areas between adjacent baffles. Thereby sufficient force is imparted to the liquid to drive it across the tray even under low vapor loads and the possibility of liquid runback through the tray is reduced or eliminated. In this manner the liquid is moved rapidly over the surface, the gas-liquid contact is complete and the liquid capacity of the tray is greatly increased. If desired, a plurality of gas-liquid disengaging plates may be provided which extend in an upward direction and which have their lower edges spaced above the upper surface of the baffle elements. These plates may be perforated and provide surfaces against which the entrained liquid and gas are hurled whereby they become disengaged.

If desired, the baffle elements comprising the main body portion of the tray may be arranged in a horizontal plane with the gas discharge openings therebetween being directed in a plane inclined somewhat to the horizontal, or the baffle plates may be arranged in a downwardly stepwise relationship with the openings between them serving to discharge vapors over the surface of the tray in a substantially horizontal plane. The latter mode of construction may be preferred where it is desired to minimize the pressure drop across each tray since gravity tends to assist the flow of liquid thereacross.

For a more complete understanding of the invention, reference will now be made to the accompanying drawing, wherein:

Fig. 1 is a fragmentary, somewhat diagrammatic sectional view of a gas-liquid contact tower including a tray illustrating one embodiment of this invention, and Fig. 2 is a fragmentary view taken along the line 2—2 of Fig. 1.

Referring now to the drawing and more particularly to Fig. 1, there is shown a conventional fractionating column or tower 10 having a plurality of spaced trays therein. One such tray 11 is here shown in its entirety and the downcomer portion 12 of a second tray positioned above tray 11 and the liquid seal pan 13 and first inductor baffle 14 of a third tray 24 positioned below tray 11 are also shown in order to more clearly indicate the disposition of the several trays within the tower and the manner in which the vapors and liquids will move therethrough. These trays define a plurality of vertically spaced gas-liquid contact zones 15 and 16 through which vapors pass upwardly in the manner hereinafter more fully described. The tray 11 and the other trays within the tower are supported by means of conventional flanges 17 welded or otherwise secured to the inner surface of the tower 10. While hereinafter the tray 11 will be described with particularity, it will be clear that each of the trays within the tower may be substantially the same, differing only in the position and orientation with respect to adjacent trays.

Depending from the tray 11 is a generally vertical downcomer member 18 which, in cooperation with the side walls of the tower 10, provides downcomer 19 for the passage of liquid downwardly from tray 11 to seal pan 13 of the tray below in a manner as will be understood. The downcomer member 18 is secured to the tray 11 in any suitable manner and is here shown secured by bolts 21. The downcomer member 18 includes an elongated strip 22 secured by welding or otherwise along the lower edge thereof to provide an edge having a bulbous-shaped cross section. Thus the elongated member 22 extends transversely across the tower 10 to form a somewhat reduced cross sectional area in the downcomer 19. The streamlining effect produced by member 22 substantially reduces the turbulence of the liquid moving through the downcomer onto the seal pan of the tray below. The seal pan area 23 of the tray 24 formed by the pan 13, the first inductor baffle 14, and a portion of the tower wall 10 retain a volume of liquid into which the lower edge of the downcomer member 18 is immersed providing a seal preventing the passage of vapors upwardly through the downcomer.

The contact tray 11 comprises a plurality of elongated, transverse, horizontally arranged baffle elements 25 each positioned in spaced overlapping relationship. The series of transversely extending baffle elements extends in a generally horizontal plane and thus creates a stepped or interrupted generally horizontal contact surface over which liquid flows in operation from left to right. Each of the baffle elements 25 is curvilinear in cross section and presents adjacent the lower edge a surface 26 which lies within a generally vertical plane and presents adjacent the upper edge a surface 27 lying within a generally horizontal plane. Along the upper edge of each of the baffle elements 25 is formed a generally vertical perforate flange 28. Each flange 28 is bent over and abuts the upper surface of an adjacent baffle element and the abutting edges of each flange 28 may be secured to the upper surface 27 of an adjacent baffle element by any suitable means such as welding. The flanges 28 are apertured to provide vapor passing orifices. These orifices may be of any desired size and shape and, only by way of example, are shown in Fig. 2 as a plurality of evenly spaced round holes 29. The tray herein described is an improvement over that described in the above referred to patent application Serial No. 243,240 in the use of a plurality of baffle elements having an apertured flanged edge as herein described. Thereby an integral tray is formed which is extremely rigid and thus capable of handling high liquid and low vapor loads. The orifices 29 provide means for jetting the vapors at high velocity across the tray whereby the liquid is thoroughly broken up and intimate contact results. By controlling the size, number and shape of the perforations 29, it is possible to readily design a tray to accommodate any required liquid or vapor load. Also it is possible to provide improved contact over the entire contact area 16 by forming apertures of varying dimensions or having fixed dimensions at varying spaced intervals.

Thus it will be seen that the improved tray comprises a series of baffles 25, the several baffles being so shaped and arranged that the upper flange of each engages the upper surface of the next adjacent baffle in the liquid discharging direction. The several baffles are so shaped that the upper surfaces thereof present a considerably more restricted area therebetween than do the lower surfaces, and the upper areas are further restricted by the apertured flanges extending thereacross. Thus when vapors pass upwardly through the openings 31 they initially move at a relatively low velocity but are jetted or hurled at a relatively high velocity through the orifices 29 of the flanges 28 across the surface of the tray in the general direction of the movement of the liquid thereover.

In the embodiment of Fig. 1 as pointed out above, the first baffle element 32 serves as a weir for the seal pan adjacent which it lies. The next three successive baffle elements 33 are stepped downwardly with the upper edge of each projecting beyond the upper edge of the baffle immediately above so that liquid passing over the weir baffle 32 cascades from the upper edge of one of the baffle elements 33 to the upper surface of the baffle adjacent to and immediately below it. Thereafter the liquid, by virtue of the high velocity vapor jets, is projected or hurled across the top of the tray in a manner that will be understood.

Preferably, a plurality of upwardly extending gas-liquid disengaging plates 34 substantially coextensive with the baffle elements 25 may be provided. These plates 34 have their lower edges spaced above the upper edges of the baffle elements 25 to permit liquid flow thereunder. However, any foam or mist that is forced by the jetting action into the space between plates 34 will be projected against one of them and the resulting impingement serves to disengage the gases from the liquids. Preferably the plates 34 are perforated with closely spaced apertures having relatively small diameters.

As is set out more clearly in the above-mentioned patent application Serial No. 243,240, each of the gas-liquid contact trays may be made up of a plurality of sections secured together in side-by-side relation to provide a complete horizontal contact area across the entire tower 10. Each tray section comprises a plurality of baffles 25 secured to appropriate end plates 36 by any of the customary means such as welding. The end plates 36 of adjacent tray sections will be, when assembled in an appropriate tower, removably secured in juxtaposition by the bolts 37.

In the operation of this device, gas or vapor is passed upwardly through the tower 10 through the successive contact trays. With particular reference to tray 11, these gases move upwardly to the under side of the tray. The vapors are prevented from escaping upwardly through the downcomer 19 by the presence of liquid in the seal pan area 23. Thus the vapors pass through the openings 31 between the baffle plates 25. The vapor velocity greatly increases in passing through the trays because of the restricted area at the upper edge thereof and the direction of travel of said gases is also changed from a generally vertical to generally horizontal direction. Thus at the upper surface of the tray, a plurality of parallel high velocity jets of vapor are discharged from the spaced orifices 29 in the flanges 28, and these jets are discharged across the upper surface of the tray in generally the same direction of movement as that of the liquid.

While the vapors are jetted across the upper surface of the tray 11 in the manner just described, liquid from the seal pan 35 passes over weir baffle 32 and cascades downwardly across the tray. As the vapor jets are moving a high velocity, no liquid will run down through the orifices 29 but will continue across the tray 11 in a generally horizontal path. A portion of the liquid passing across the tray is picked up by the vapor jets to form a foam or mist which is projected against the surfaces of the plates 34 which serve to disengage the gases from the liquids. The disentrained gases then pass upwardly to the next successive tray where the operation is repeated. The disengaged liquids return to the main stream flowing across the tray 11. It will be clear that if the liquid volume is large, there will be a certain percentage of it that is not hurled against the plates 34 but will move as a highly turbulent mass across the tray where it is discharged to the downcomer 19, seal pan area 23 and the next lower tray in the usual fashion.

Various modifications of the plates 34 and the baffle elements 25 may be made without departing from the spirit and scope of this invention. The angle at which plates 34 are mounted, the size of the perforations therein and the space between the baffle elements 25 and plates 34 are all design features which will determine the liquid and vapor capacity of the tray. Likewise, the baffle elements may be arranged to provide greater vapor velocity, liquid flow, contact efficiency or reduced vapor pressure drop as is understood from a consideration of the above referred to application Serial No. 243,240.

Thus it will be seen that an improved gas-liquid contact tray is provided which is particularly useful in the art of fractionation or distillation where it is desired to contact liquids and vapors under conditions of high liquid load and low vapor load. As will be apparent from the foregoing, various modifications may be incorporated in the teachings herein to adapt the apparatus for varying conditions of operation. For example, the shape, size and number of baffle elements may be varied to provide varying vapor velocities and vapor-to-liquid ratios. The size, number and spacing of the tray apertures through which the gases pass may be varied to further regulate vapor velocity. In place of perforations 29, notches may be formed in the edges of the flanges 28 in order to provide means for passing the vapors through the tray.

This invention has been described above as having particular utility in the gas-liquid contact art. However, it will be apparent that under certain conditions of operation it may be used to contact liquids of different densities whereby improved liquid-liquid contact is effected.

While one particular embodiment of this invention is shown above, it will be clearly understood, of course, that the invention is not limited thereto, since many modifications may be made, and it is contemplated, therefore, by the appended claims, to cover all such modifications as fall within the true spirit and scope of this invention.

We claim:

1. A gas-liquid contact tray having spaced liquid-receiving and liquid-discharging positions for flowing a liquid across an upper surface thereof, comprising a plurality of elongated baffle plates having substantially parallel longitudinal axes arranged transversely of the direction of movement of liquid flowed across said tray, each of said plates being in the form of an inverted trough having lower and upper longitudinal edges, with the lower edge of each plate being transversely disposed closer to said receiving position than said upper edge, the portion of each plate adjacent said lower edge lying within an upwardly extending plane and the portion of each plate adjacent said upper edge lying within a transverse plane, said baffle plates being also arranged in spaced, overlapping relationship whereby the upper edge of one plate overlies the transversely extending portion of a next adjacent plate, whereby to provide gas passageways between said plates, said upper edge having a depending flange engaging the last mentioned portion of said next adjacent plate, aperture defining means in said flange, said gas passageways sloping continuously upwardly through said tray and being more restricted adjacent the upper surface of said tray than adjacent the lower surface of said tray for passing gas upwardly through said tray and for discharging said gas through said aperture means toward said liquid discharging position into the liquid flowed over said tray.

2. The contact tray recited in claim 1 wherein said baffle plates are curvilinear in cross section providing an arcuate-shaped gas passageway and wherein each of said depending flanges is secured to said portion of the next adjacent plate with which it is engaged.

3. The contact tray recited in claim 2 wherein said depending flange lies in a substantially vertical plane extending transversely of the normal direction of flow of liquid across said tray.

References Cited in the file of this patent

UNITED STATES PATENTS

| Number | Name | Date |
|---|---|---|
| 468,919 | Rettenmeyer | Feb. 16, 1892 |
| 489,147 | Golding | Jan. 3, 1893 |
| 764,049 | Guldlin | July 5, 1904 |
| 1,434,301 | Liljegran | Oct. 31, 1922 |
| 2,010,010 | Chillas | Aug. 6, 1935 |
| 2,510,590 | Kraft | June 6, 1950 |

FOREIGN PATENTS

| Number | Country | Date |
|---|---|---|
| 29,057 | Germany | Oct. 13, 1884 |
| 839,695 | France | Jan. 7, 1939 |